(12) United States Patent
Fernandez

(10) Patent No.: US 7,073,343 B1
(45) Date of Patent: Jul. 11, 2006

(54) VEHICLE AIR CONDITIONER WITH INVERTER

(76) Inventor: Robert A. Fernandez, 8620 NW. 190th Ter., Miami, FL (US) 33015

( * ) Notice: Subject to any disclaimer, the term of this patent is extended or adjusted under 35 U.S.C. 154(b) by 878 days.

(21) Appl. No.: 09/993,261

(22) Filed: Nov. 14, 2001

(51) Int. Cl.
F25D 17/04 (2006.01)
B60H 1/32 (2006.01)

(52) U.S. Cl. .................... 62/186; 62/239; 62/228.4
(58) Field of Classification Search ............ 62/186, 62/239, 228.4, 244, 133, 134, 323.1
See application file for complete search history.

(56) References Cited

U.S. PATENT DOCUMENTS

| | | | |
|---|---|---|---|
| 4,024,444 A | 5/1977 | Dewan | |
| 4,870,833 A | * 10/1989 | Matsuda et al. | 62/228.4 |
| 5,810,078 A | 9/1998 | Knutsson | |
| 6,166,514 A | 12/2000 | Ando | |

* cited by examiner

Primary Examiner—Chen Wen Jiang
(74) Attorney, Agent, or Firm—Alvin S. Blum

(57) ABSTRACT

A cooling system for a vehicle having a direct current electric power supply includes a compressor driven by an engine, a condenser connected to the compressor, and an evaporator connected between the condenser and the compressor. The fans for blowing air past the condenser and the evaporator are powered by alternating current motors that are much more economical and maintenance-free than the direct current motors currently in use. An inverter connected to the direct current power supply provides alternating current to the alternating current motors. In an alternative embodiment, the inverter may provide variable output frequency, and the motors may have output speed related to current frequency for temperature control.

2 Claims, 1 Drawing Sheet

VEHICLE AIR CONDITIONER WITH INVERTER

This invention relates to apparatus for cooling a motor vehicle in which certain of the moving elements other than the compressor are powered from the vehicle DC power through an inverter to provide more efficient AC powered elements.

BACKGROUND OF THE INVENTION

The air conditioning apparatus for a small motor vehicle generally includes a compressor that is driven by a power take-off from the engine. The condenser is positioned in line with the engine radiator. Both are cooled by a common fan that is also driven by a power take-off from the engine. The air handler fan is generally driven by a DC motor powered by the vehicle electric supply. When large vehicles such as busses and trucks are air conditioned, the compressor is in the engine compartment where it is driven by an engine power take-off. The condenser and air handler may be remote from the engine. The fans for these components are run off the vehicle DC power. The DC motors for, these fans are large, expensive, and require frequent service, especially for brush replacement. It would be desirable to be able to employ more compact and less expensive motors that are low in maintenance requirements.

SUMMARY OF THE INVENTION

It is accordingly an object of the invention to provide a means for driving fans for the condenser and air handler of a vehicle that are compact, low cost, and low in maintenance requirements. The apparatus of the invention comprises a direct current (DC) to alternating current (AC) inverter that receives DC power from the vehicle electric supply. The DC power is converted to AC power. This enables the system to use inexpensive, reliable AC motors to drive the fans. In a preferred embodiment, the AC frequency produced is high, such as 400 hz. At higher frequencies, the size of the motor for a given horsepower is reduced. The motor may be of the type without brushes that requires very little maintenance. The inverter may be of the variable frequency type, when it is desired to vary the speed of the fans by varying the frequency. The system may employ 60 hz to enable use of very inexpensive motors that are readily available.

These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
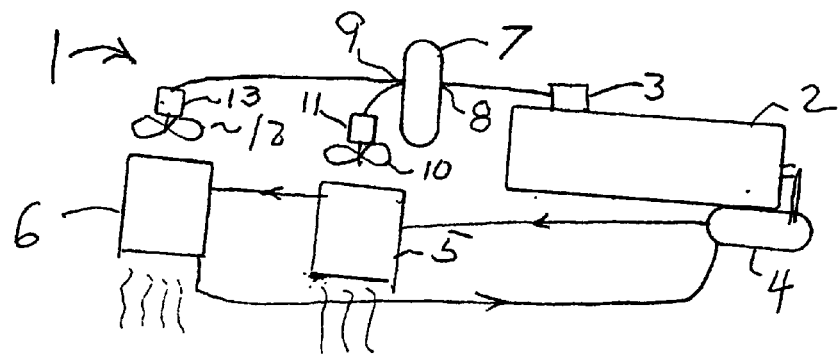
FIG. 1 is a schematic diagram of the system of the invention

Referring now first to FIG. 1, the cooling system 1 for a vehicle having an engine 2 and a low voltage dc power supply 3 has a compressor 4 driven by the engine. The compressed refrigerant goes to condenser 5 and then evaporator 6 before returning to the compressor in a conventional refrigerant cycle. A condenser fan 10 cools the condenser. An AC motor 11 drives the fan 10. An evaporator fan 12 blows air through the evaporator to provide cool air to the air space 16 being cooled. An AC motor 13 drives fan 12. Both AC motors 11 and 13 are powered by the AC output 9 from the DC to AC inverter 7 that is powered by the low voltage DC electric supply 3 connected at the inverter input 8. The AC motors may be of the sort readily available inexpensively and much more maintenance free than their DC counterparts. In addition, they may be more compact. As the frequency of a motor increases, the size decreases.

Figure 2:
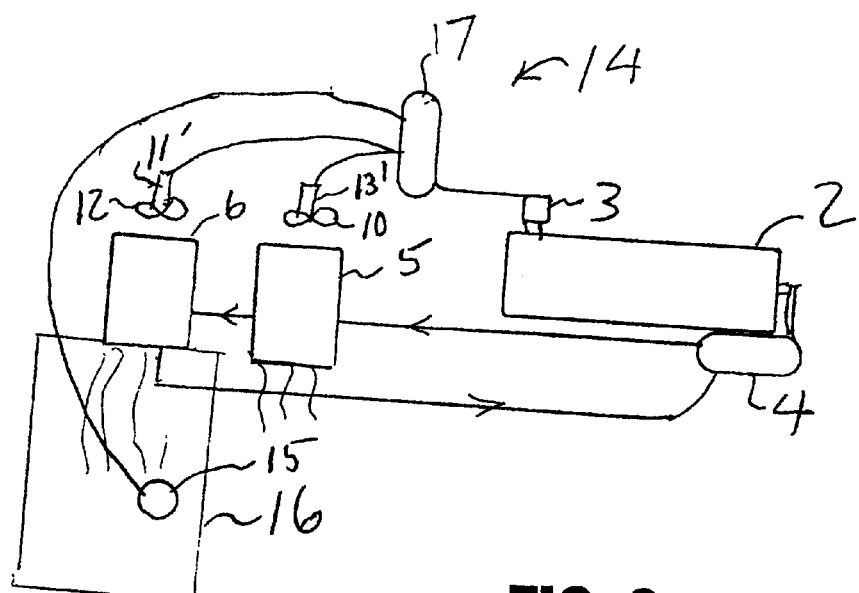
FIG. 2 is a schematic diagram of the system of another embodiment of the invention.

Referring now to FIG. 2, the system 14 features a variable frequency inverter 17 and a thermostat 15 in the air space 16 being cooled. The thermostat regulates the output frequency of the inverter. The motors 11' and 13' rotate at a speed related to the frequency of the input current. This system provides an elegant means of temperature regulation.

While we have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A cooling system for a vehicle having a low voltage DC electric supply and an engine, the cooling system comprising:
   a) a compressor driven by the engine, so that the speed of the engine determines the speed of the compressor;
   b) a condenser connected to the compressor;
   c) an evaporator connected to the condenser and the compressor;
   d) a DC to AC inverter connected to the low voltage DC electric supply;
   e) a first AC powered fan connected to the AC output of the inverter for cooling the condenser; and
   f) a second AC powered fan connected to the AC output of the inverter for circulating air through the evaporator and the space being cooled.

2. The cooling system according to claim 1, in which the inverter is capable of providing a variable frequency output and at least one of the first AC powered fan and the second AC powered fan have motors whose speed is related to the frequency of the AC power for temperature regulation.

* * * * *